United States Patent [19]

Hubbard, Jr. et al.

[11] 3,995,312

[45] Nov. 30, 1976

[54] COLOR DOT DISPLAY

[75] Inventors: Clyde W. Hubbard, Jr.; Emmett J. Klein, Jr.; Michael J. Castelberg, all of Houston, Tex.; Nigel A. Anstey, Sevenoaks, England

[73] Assignee: Seiscom Delta Inc., Houston, Tex.

[22] Filed: Feb. 28, 1975

[21] Appl. No.: 554,186

[52] U.S. Cl. .......................... 358/81; 340/15.5 DS
[51] Int. Cl.$^2$ ...................... H04N 9/04; G01V 1/00
[58] Field of Search ................. 358/81, 82, 75, 78; 250/416 TV; 178/DIG. 5, DIG. 22; 340/15.5 DP, 15.5 DS; 343/5 CD

[56] References Cited
UNITED STATES PATENTS

| | | | |
|---|---|---|---|
| 3,267,283 | 8/1966 | Kapany | 358/81 |
| 3,504,975 | 4/1970 | White | 358/81 |
| 3,624,634 | 11/1971 | Dorion | 358/81 |
| 3,662,325 | 5/1972 | Savit | 340/15.5 |
| 3,717,722 | 2/1973 | Messner | 358/78 |
| 3,749,823 | 7/1973 | Warner | 178/6.8 |
| 3,766,519 | 10/1973 | Stephenson | 340/15.5 |
| 3,812,288 | 5/1974 | Walsh et al. | 178/DIG. 5 |
| 3,899,768 | 8/1975 | Quay et al. | 340/15.5 |
| 3,922,484 | 11/1975 | Keller | 358/81 |

OTHER PUBLICATIONS

"Automated Color Mapping...", Intl. Geochem. Exploration Symposium Proc. No. 41973, P. L. Lowenstein, et al., pp. 297–304 incl.

"Computer Graphics in Geophysics", Geophysics, vol. 37, No. 5, pp. 825–838, Oct. 1972, by A. B. Smith, et al.

"Significance of Color Displays...", Soc. Explor. Geophys. Ann. Intl. Mtg., No. 43, pp. 6–7, 1973, N. A. Anstey.

"Color This Brain Visible", by D. Ross, Life, 3/07/69, pp. 78–80 inc.

Primary Examiner—John C. Martin
Attorney, Agent, or Firm—Pravel & Wilson

[57] ABSTRACT

A color dot display and method of forming same by applying colors to dot areas within a matrix of cells in accordance with a color code defining the number of dot areas in the cells, and their locations in the cells, to receive the colors. The proportion of dots of a particular color in a cell defines the representation or saturation of that color in the cell, while the superposition, whether visual or physical or both, of the dots of the various component colors in a cell defines the apparent or resulting color of the cell.

19 Claims, 15 Drawing Figures

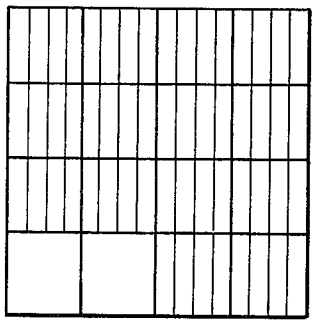
Fig. 3A
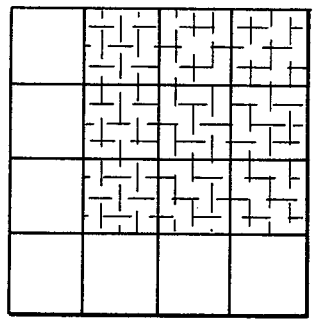
Fig. 3B
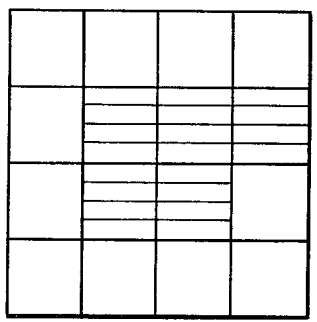
Fig. 3C
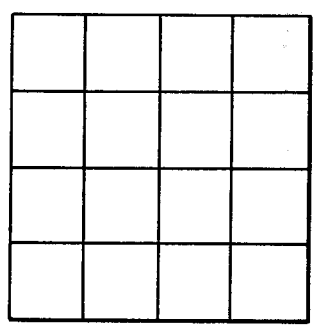
Fig. 3D
| 7 | 8 | 9 | 10 |
|---|---|---|---|
| 6 | 1 | 2 | 11 |
| 5 | 4 | 3 | 12 |
| 16 | 15 | 14 | 13 |
Fig. 5A
| 16 | 5 | 6 | 7 |
|---|---|---|---|
| 15 | 4 | 1 | 8 |
| 14 | 3 | 2 | 9 |
| 13 | 12 | 11 | 10 |
Fig. 5B
| 13 | 14 | 15 | 16 |
|---|---|---|---|
| 12 | 3 | 4 | 5 |
| 11 | 2 | 1 | 6 |
| 10 | 9 | 8 | 7 |
Fig. 5C
| 10 | 11 | 12 | 13 |
|---|---|---|---|
| 9 | 2 | 3 | 14 |
| 8 | 1 | 4 | 15 |
| 7 | 6 | 5 | 16 |
Fig. 5D

COLOR DOT DISPLAY

CROSS-REFERENCE TO RELATED APPLICATIONS

This invention relates to forming displays in color, as does co-pending U.S. patent application Ser. No. 441,012, filed Feb. 11, 1974, now abandoned, and assigned to the assignee of the present invention.

BACKGROUND OF INVENTION

1. FIELD OF INVENTION

The present invention relates to formation of color displays.

2. DESCRIPTION OF PRIOR ART

Prior art color processing techniques, such as half-tone processing, were not readily adapted to conversion of black-and-white images or digital signals into color, since an initial or original color print was required as an input for half-tone color processing. From the initial color print, several half-tone color prints or separations were made. Unless precautions were taken, portions of the half-tone separations would often overlap and interfere with each other in moire interference patterns, reducing the clarity and effectiveness of the display. Further, it was often difficult to accurately and precisely reproduce duplicate half-tone color displays.

Further, with the prior art color techniques, definition of the hue or shade of a color or color mix in the display has been imprecise and subjective, hampering accurate repetitive reproduction of these color displays.

SUMMARY OF INVENTION

Briefly, the present invention provides a new and improved color dot display and a method of forming such color dot displays. The displays may be formed from an input image which may be black-and-white seismic data displays, X-ray negatives, or displays of other types of data such as photographs of artistic or other interest. The displays may also be formed from suitably encoded digital signals which may be seismic signals or other suitable signals appropriately digitally encoded.

When an input image is used, the area of the image is allocated into a matrix of cells and the image is scanned. A color code is assigned for various portions of the image according to the optical density of the image. Where digital signals are to be displayed, the signals are converted into the color code.

The color code defines the number of dots in dot arrays within the cells of the matrix which receive constituent or component colors of the color display, as well as the location of the dots in the arrays which are to receive the colors, so that the proportion of dots of a particular constituent color in dot areas of a cell in the matrix defines the relative presence of that color in the cell, while the superposition of dots of the component colors defines the resulting or apparent color of the cell.

It is an object of the present invention to provide a new and improved color dot display and a method of making such a color dot display.

BRIEF DESCRIPTION OF THE DRAWINGS

FIGS. 3A, 3B, 3C and 3D are enlarged schematic diagrams of color dots and cells of a portion of FIG. 2;

FIGS. 5A, 5B, 5C and 5D are enlarged schematic diagrams, like FIGS. 3A through 3D, respectively, of color dots in cells and illustrating the ascending sequence of dots according to the color code.

Figure 1:
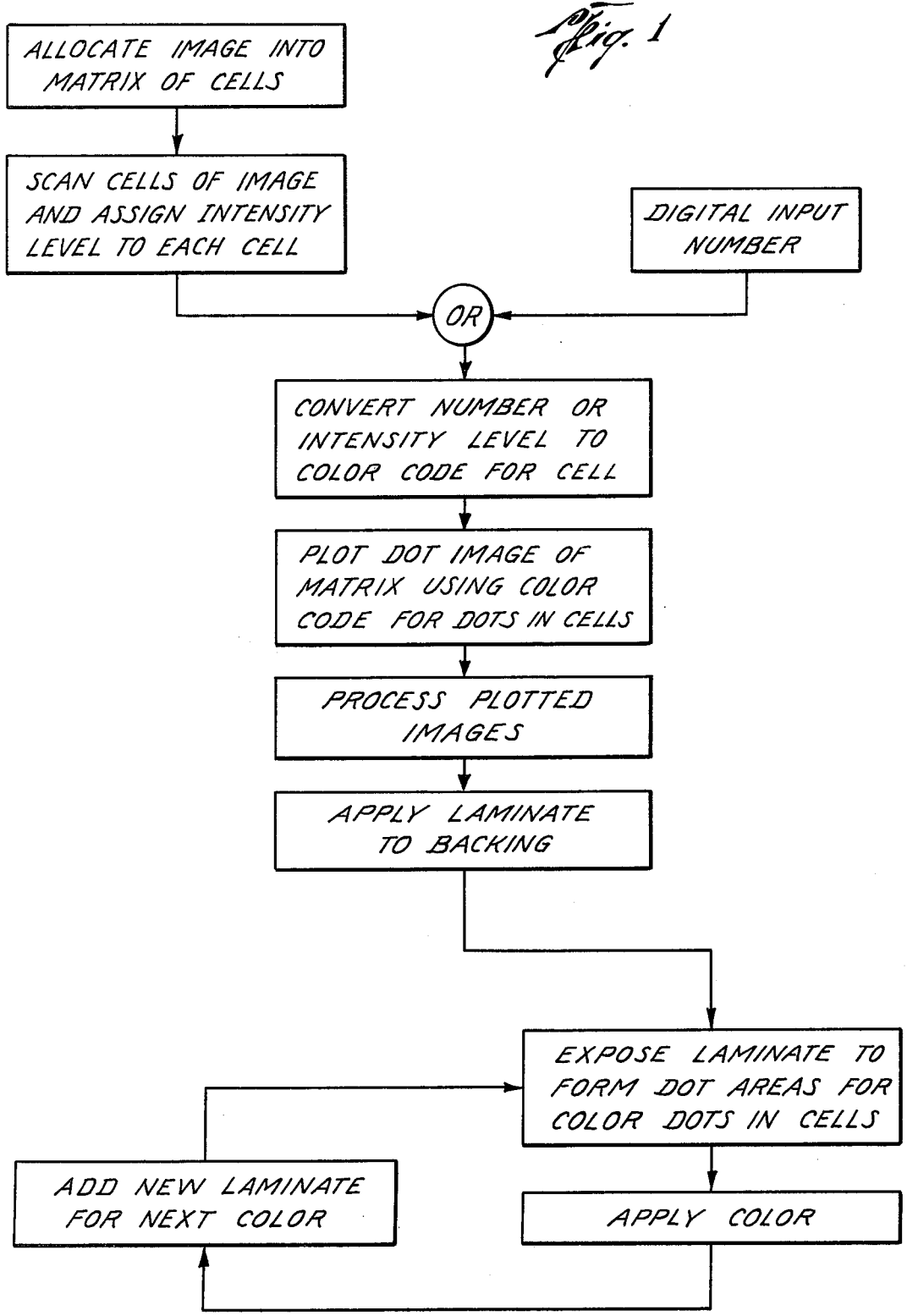
FIG. 1 is a schematic diagram of the process of the present invention.

DESCRIPTION OF THE PREFERRED EMBODIMENT:

The present invention relates to forming, in the preferred embodiment by the process set forth schematically in FIG. 1, a color display of data or images and is particularly adapted for forming a color display from either digitally encoded date or from a photographic or other image. The present invention is especially adapted to form color displays of geophysical data, where geophysical variables are plotted as functions of seismic signal travel time, or medical X-rays, as will be set forth. It should be understood, however, that the present invention is equally adapted for forming color displays of scientific, medical, industrial and other types of technological data. Furthermore, the present invention is also adapted to form color displays of black-and-white photographs of artistic interest or other images of artistic or other interest. The present invention will first be set forth with respect to the formation of a color display from a photographic image, namely an X-ray, and then with respect to formation of a color display from digital input signals.

PHOTOGRAPHIC IMAGE

The input for this embodiment of the invention is a black-and-white photographic image, such as an X-ray of a human skull. The input photographic image is provided to a conventional scanner, such as an Optronics Model P-1000, which scans the input image in a sequence of very small scanning steps to allocate the image into a matrix of adjoining cells of substantially microscopic size. Example cell sizes are squares having sides with lengths of 50, 100, 200, and 400 microns. The scanner examines and scans the cells of the input image to optically determine the optical density of the image for each cell. The scanner then assigns a digital number or intensity level to each cell based on the optical or photographic density of the image in the cell. The scanner then provides the intensity level number to a suitable memory device, such as a magnetic tape.

With the present invention, it has been found that repeatedly accurate color displays of definable color hues and intensities can be formed. As will be set forth in detail below, corresponding cells on the color display to be formed are divided into arrays of a plurality of color dot areas adapted to receive color in accordance with a color code to be set forth. If desired, the corresponding cells may be expanded or reduced in scale from that of the input image.

In one suitable embodiment, cells 200 microns long and 200 microns wide of an input optical image are further divided into a four-by-four array of 50 micron square dot areas to form 16 dot areas adapted to receive colors in accordance with a color code. It should be understood that these dimensions are exemplary, and that other dimensions may be used for the color cells, arrays and color dot areas, if desired. Also, the size of dot areas may be varied from one display to another, from one color image within a display to another, or within a color display, if desired. Further, the color dot areas need not be squares, but may be rectangular, circular or other suitable shape, if desired. Accordingly, with the present invention as set forth below, the term dot areas includes microscopic spots or marks of any suitable configuration. It is preferable, however, for purposes of contiguity and elimination of overlapping and blurring to use spots which abut each other but do not overlap.

In the drawings, FIGS. 3A through 3D, inclusive, and FIGS. 5A through 5D, inclusive, exemplify greatly magnified colored cells having the four-by-four array of dot areas therein.

The digital numbers representing the intensity level of the input image in each of the scanned cells thereof are then converted to a color code defining for each such cell the number of dot areas within the cell and the location of the dot areas within the cell to receive color.

Figure 2:
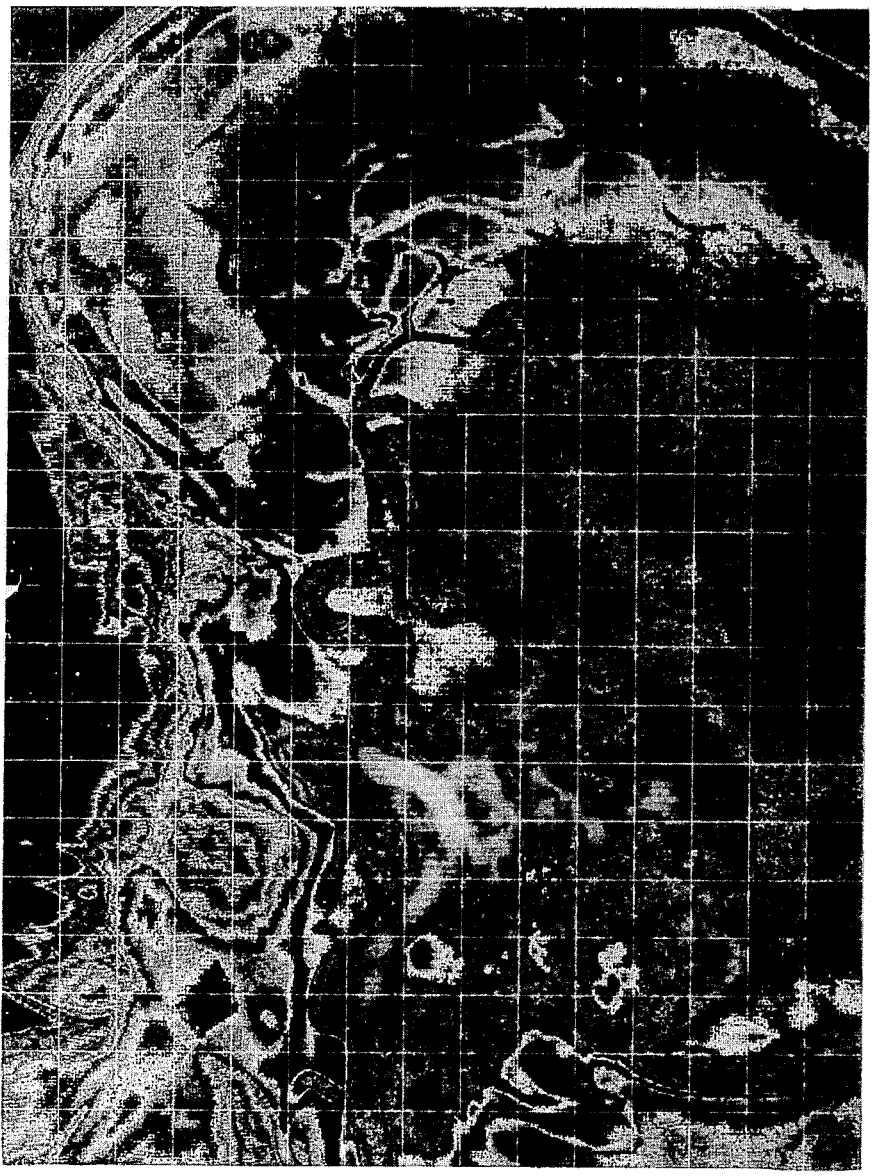
FIG. 2 is a display of the present invention formed from a black-and-white skull X-ray.
Figure 2:
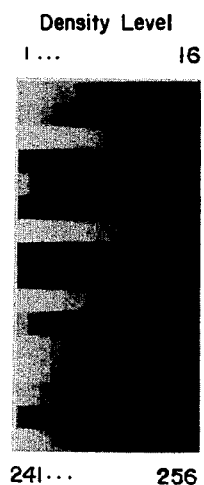

For example, in a color display D according to the present invention of an X-ray of the human skull (FIG. 2), a color key identifying the numerical relation between the component colors of the color display is located to the right of the display and is entitled Density Level. In the color key are presented sixteen rows of sixteen differing colors, or a total of 256 colors. These colors are formed by the superposition of images, in a manner to be set forth, of cells composed of color dots of four component colors: magenta, yellow, cyan and black, which have different numbers of dot areas therein receiving the colors. The 256 colors are assigned 256 different intensity levels in the input X-ray image. In FIGS. 3A through 3D, inclusive, the formation of the color exemplified at Density Level 32 for the rightmost color in the second row, is set forth. For this color, 14 of the 16 dot areas within each 200 micron square cell in the colored area of FIG. 2 are colored with magenta, 9 of the dot areas in each such cell are colored with yellow, and 5 of the dot areas in such cell are colored with cyan or blue. No black dot areas are used in the color for density level 32. In this manner, in each such cell the 14 magenta dot areas define a high magenta hue for the cell, the 9 yellow dot areas define an intermediate yellow hue for the cell, while the 5 blue dot areas define a light blue hue for the cell. The cells of the magenta, yellow and cyan hues when superimposed, in a manner to be set forth below, form the 32nd Density Level color in accordance with the present invention, which is a shade somewhere between maroon and purple. However, by using the color quantification of 14 magenta dots, 9 yellow dots and 5 cyan dots per cell, this color can be accurately defined and repeatedly obtained. The remaining 255 colors in the color key are similarly quantifiable and definable as a superposition of various members of color dots of the four component colors in each cell and are set forth in Chart I below.

CHART I

COLOR KEY AND CODE

| Density Level-Color | Magenta | Yellow | Cyan | Black |
|---|---|---|---|---|
| | M | Y | C | B |
| 1 | 0 | 0 | 1 | 1 |
| 2 | 0 | 0 | 2 | 1 |
| 3 | 0 | 0 | 2 | 2 |
| 4 | 0 | 0 | 3 | 2 |
| 5 | 0 | 0 | 4 | 2 |
| 6 | 0 | 0 | 4 | 3 |
| 7 | 0 | 0 | 5 | 3 |
| 8 | 0 | 0 | 6 | 3 |
| 9 | 0 | 0 | 6 | 4 |
| 10 | 0 | 0 | 7 | 4 |
| 11 | 0 | 0 | 8 | 4 |
| 12 | 0 | 0 | 8 | 5 |
| 13 | 0 | 0 | 9 | 5 |
| 14 | 0 | 0 | 10 | 5 |
| 15 | 0 | 0 | 10 | 6 |
| 16 | 0 | 0 | 11 | 6 |
| 17 | 2 | 1 | 1 | 0 |
| 18 | 2 | 1 | 2 | 0 |
| 19 | 3 | 1 | 2 | 0 |
| 20 | 4 | 2 | 2 | 0 |
| 21 | 5 | 3 | 2 | 0 |
| 22 | 6 | 4 | 2 | 0 |
| 23 | 7 | 5 | 2 | 0 |
| 24 | 7 | 5 | 3 | 0 |
| 25 | 8 | 5 | 3 | 0 |
| 26 | 9 | 6 | 3 | 0 |
| 27 | 10 | 6 | 3 | 0 |
| 28 | 11 | 7 | 3 | 0 |
| 29 | 11 | 7 | 4 | 0 |
| 30 | 12 | 7 | 4 | 0 |
| 31 | 13 | 8 | 4 | 0 |
| 32 | 14 | 9 | 5 | 0 |
| 33 | 0 | 0 | 1 | 0 |
| 34 | 0 | 0 | 2 | 0 |
| 35 | 0 | 0 | 3 | 0 |
| 36 | 0 | 0 | 4 | 0 |
| 37 | 0 | 0 | 5 | 0 |
| 38 | 0 | 0 | 6 | 0 |
| 39 | 0 | 0 | 7 | 0 |
| 40 | 0 | 0 | 8 | 0 |
| 41 | 0 | 0 | 9 | 0 |
| 42 | 0 | 0 | 10 | 0 |
| 43 | 0 | 0 | 11 | 0 |
| 44 | 0 | 0 | 12 | 0 |
| 45 | 0 | 0 | 13 | 0 |
| 46 | 0 | 0 | 14 | 0 |
| 47 | 0 | 0 | 15 | 0 |
| 48 | 0 | 0 | 16 | 0 |
| 49 | 0 | 16 | 1 | 0 |
| 50 | 0 | 16 | 2 | 0 |
| 51 | 0 | 16 | 3 | 0 |
| 52 | 0 | 16 | 4 | 0 |
| 53 | 0 | 16 | 5 | 0 |
| 54 | 0 | 16 | 6 | 0 |
| 55 | 0 | 16 | 7 | 0 |
| 56 | 0 | 16 | 8 | 0 |
| 57 | 0 | 16 | 9 | 0 |
| 58 | 0 | 16 | 10 | 0 |
| 59 | 0 | 16 | 11 | 0 |
| 60 | 0 | 16 | 12 | 0 |
| 61 | 0 | 16 | 13 | 0 |
| 62 | 0 | 16 | 14 | 0 |
| 63 | 0 | 16 | 15 | 0 |
| 64 | 0 | 16 | 16 | 0 |
| 65 | 2 | 4 | 0 | 0 |
| 66 | 3 | 5 | 0 | 0 |
| 67 | 4 | 6 | 0 | 0 |
| 68 | 5 | 7 | 0 | 0 |
| 69 | 6 | 8 | 0 | 0 |
| 70 | 7 | 9 | 0 | 0 |
| 71 | 8 | 10 | 0 | 0 |
| 72 | 9 | 11 | 0 | 0 |
| 73 | 8 | 12 | 0 | 0 |
| 74 | 7 | 13 | 0 | 0 |
| 75 | 6 | 14 | 0 | 0 |
| 76 | 5 | 13 | 0 | 0 |
| 77 | 4 | 12 | 0 | 0 |
| 78 | 3 | 11 | 0 | 0 |
| 79 | 2 | 10 | 0 | 0 |
| 80 | 1 | 9 | 0 | 0 |
| 81 | 1 | 16 | 0 | 0 |
| 82 | 2 | 16 | 0 | 0 |
| 83 | 3 | 16 | 0 | 0 |
| 84 | 4 | 16 | 0 | 0 |
| 85 | 5 | 16 | 0 | 0 |
| 86 | 6 | 16 | 0 | 0 |

CHART I-continued

COLOR KEY AND CODE

| Density Level-Color | Magenta | Yellow | Cyan | Black |
|---|---|---|---|---|
| 87 | 7 | 16 | 0 | 0 |
| 88 | 8 | 16 | 0 | 0 |
| 89 | 9 | 16 | 0 | 0 |
| 90 | 10 | 16 | 0 | 0 |
| 91 | 11 | 16 | 0 | 0 |
| 92 | 12 | 16 | 0 | 0 |
| 93 | 13 | 16 | 0 | 0 |
| 94 | 14 | 16 | 0 | 0 |
| 95 | 15 | 16 | 0 | 0 |
| 96 | 16 | 16 | 0 | 0 |
| 97 | 0 | 1 | 0 | 0 |
| 98 | 0 | 2 | 0 | 0 |
| 99 | 0 | 3 | 0 | 0 |
| 100 | 0 | 4 | 0 | 0 |
| 101 | 0 | 5 | 0 | 0 |
| 102 | 0 | 6 | 0 | 0 |
| 103 | 0 | 7 | 0 | 0 |
| 104 | 0 | 8 | 0 | 0 |
| 105 | 0 | 9 | 0 | 0 |
| 106 | 0 | 10 | 0 | 0 |
| 107 | 0 | 11 | 0 | 0 |
| 108 | 0 | 12 | 0 | 0 |
| 109 | 0 | 13 | 0 | 0 |
| 110 | 0 | 14 | 0 | 0 |
| 111 | 0 | 15 | 0 | 0 |
| 112 | 0 | 16 | 0 | 0 |
| 113 | 9 | 0 | 1 | 0 |
| 114 | 10 | 0 | 1 | 0 |
| 115 | 11 | 0 | 1 | 0 |
| 116 | 12 | 0 | 1 | 0 |
| 117 | 13 | 0 | 1 | 0 |
| 118 | 14 | 0 | 1 | 0 |
| 119 | 15 | 0 | 1 | 0 |
| 120 | 16 | 0 | 1 | 0 |
| 121 | 16 | 0 | 2 | 0 |
| 122 | 16 | 0 | 3 | 0 |
| 123 | 16 | 0 | 4 | 0 |
| 124 | 16 | 0 | 5 | 0 |
| 125 | 16 | 0 | 6 | 0 |
| 126 | 16 | 0 | 7 | 0 |
| 127 | 16 | 0 | 8 | 0 |
| 128 | 16 | 0 | 9 | 0 |
| 129 | 1 | 16 | 1 | 0 |
| 130 | 2 | 16 | 2 | 0 |
| 131 | 3 | 16 | 3 | 0 |
| 132 | 4 | 16 | 4 | 0 |
| 133 | 5 | 16 | 5 | 0 |
| 134 | 6 | 16 | 6 | 0 |
| 135 | 7 | 17 | 7 | 0 |
| 136 | 8 | 16 | 8 | 0 |
| 137 | 9 | 16 | 9 | 0 |
| 138 | 10 | 16 | 10 | 0 |
| 139 | 11 | 16 | 11 | 0 |
| 140 | 12 | 16 | 12 | 0 |
| 141 | 13 | 16 | 13 | 0 |
| 142 | 14 | 16 | 14 | 0 |
| 143 | 15 | 16 | 15 | 0 |
| 144 | 16 | 16 | 16 | 0 |
| 145 | 0 | 1 | 1 | 0 |
| 146 | 0 | 1 | 2 | 0 |
| 147 | 0 | 2 | 3 | 0 |
| 148 | 0 | 2 | 4 | 0 |
| 149 | 0 | 3 | 5 | 0 |
| 150 | 0 | 3 | 6 | 0 |
| 151 | 0 | 4 | 7 | 0 |
| 152 | 0 | 4 | 8 | 0 |
| 153 | 0 | 5 | 9 | 0 |
| 154 | 0 | 5 | 10 | 0 |
| 155 | 0 | 6 | 11 | 0 |
| 156 | 0 | 6 | 12 | 0 |
| 157 | 0 | 7 | 13 | 0 |
| 158 | 0 | 7 | 14 | 0 |
| 159 | 0 | 8 | 15 | 0 |
| 160 | 0 | 8 | 16 | 0 |
| 161 | 1 | 6 | 2 | 0 |
| 162 | 2 | 7 | 3 | 0 |
| 163 | 3 | 8 | 3 | 0 |
| 164 | 4 | 9 | 4 | 0 |
| 165 | 5 | 10 | 4 | 0 |
| 166 | 6 | 11 | 4 | 0 |
| 167 | 7 | 12 | 4 | 0 |
| 168 | 9 | 13 | 4 | 0 |
| 169 | 9 | 14 | 4 | 0 |
| 170 | 10 | 15 | 4 | 0 |
| 171 | 11 | 16 | 4 | 0 |
| 172 | 12 | 16 | 4 | 0 |
| 173 | 13 | 16 | 4 | 0 |
| 174 | 14 | 16 | 4 | 0 |
| 175 | 15 | 16 | 4 | 0 |
| 176 | 16 | 16 | 4 | 0 |
| 177 | 0 | 4 | 1 | 0 |
| 178 | 0 | 5 | 2 | 0 |
| 179 | 0 | 5 | 3 | 0 |
| 180 | 0 | 6 | 4 | 0 |
| 181 | 0 | 6 | 5 | 0 |
| 182 | 0 | 7 | 6 | 0 |
| 183 | 0 | 7 | 7 | 0 |
| 184 | 0 | 8 | 8 | 0 |
| 185 | 0 | 8 | 9 | 0 |
| 186 | 0 | 9 | 10 | 0 |
| 187 | 0 | 10 | 11 | 0 |
| 188 | 0 | 10 | 12 | 0 |
| 189 | 0 | 10 | 13 | 0 |
| 190 | 0 | 11 | 14 | 0 |
| 191 | 0 | 11 | 15 | 0 |
| 192 | 0 | 11 | 16 | 0 |
| 193 | 1 | 0 | 0 | 0 |
| 194 | 2 | 0 | 0 | 0 |
| 195 | 3 | 0 | 0 | 0 |
| 196 | 4 | 0 | 0 | 0 |
| 197 | 5 | 0 | 0 | 0 |
| 198 | 6 | 0 | 0 | 0 |
| 199 | 7 | 0 | 0 | 0 |
| 200 | 8 | 0 | 0 | 0 |
| 201 | 9 | 0 | 0 | 0 |
| 202 | 10 | 0 | 0 | 0 |
| 203 | 11 | 0 | 0 | 0 |
| 204 | 12 | 0 | 0 | 0 |
| 205 | 13 | 0 | 0 | 0 |
| 206 | 14 | 0 | 0 | 0 |
| 207 | 15 | 0 | 0 | 0 |
| 208 | 16 | 0 | 0 | 0 |
| 209 | 2 | 1 | 0 | 0 |
| 210 | 3 | 1 | 0 | 0 |
| 211 | 4 | 2 | 0 | 0 |
| 212 | 5 | 2 | 0 | 0 |
| 213 | 6 | 3 | 0 | 0 |
| 214 | 7 | 4 | 0 | 0 |
| 215 | 8 | 5 | 0 | 0 |
| 216 | 9 | 5 | 0 | 0 |
| 217 | 10 | 6 | 0 | 0 |
| 218 | 11 | 7 | 0 | 0 |
| 219 | 12 | 8 | 0 | 0 |
| 220 | 13 | 9 | 0 | 0 |
| 221 | 14 | 10 | 0 | 0 |
| 222 | 15 | 11 | 0 | 0 |
| 223 | 16 | 12 | 0 | 0 |
| 224 | 16 | 14 | 0 | 0 |
| 225 | 2 | 0 | 16 | 0 |
| 226 | 3 | 0 | 16 | 0 |
| 227 | 4 | 0 | 16 | 0 |
| 228 | 5 | 0 | 16 | 0 |
| 229 | 6 | 0 | 16 | 0 |
| 230 | 7 | 0 | 16 | 0 |
| 231 | 8 | 0 | 16 | 0 |
| 232 | 9 | 0 | 16 | 0 |
| 233 | 10 | 0 | 16 | 0 |
| 234 | 11 | 0 | 16 | 0 |
| 235 | 12 | 0 | 16 | 0 |
| 236 | 13 | 0 | 16 | 0 |
| 237 | 14 | 0 | 16 | 0 |
| 238 | 15 | 1 | 16 | 0 |
| 239 | 16 | 2 | 16 | 0 |
| 240 | 16 | 3 | 16 | 0 |
| 241 | 0 | 0 | 0 | 1 |
| 242 | 0 | 0 | 0 | 2 |
| 243 | 0 | 0 | 0 | 3 |
| 244 | 0 | 0 | 0 | 4 |
| 245 | 0 | 0 | 0 | 5 |
| 246 | 0 | 0 | 0 | 6 |
| 247 | 0 | 0 | 0 | 7 |
| 248 | 0 | 0 | 0 | 8 |
| 249 | 0 | 0 | 0 | 9 |
| 250 | 0 | 0 | 0 | 10 |
| 251 | 0 | 0 | 0 | 11 |
| 252 | 0 | 0 | 0 | 12 |
| 253 | 0 | 0 | 0 | 13 |
| 254 | 0 | 0 | 0 | 14 |
| 255 | 0 | 0 | 0 | 15 |
| 256 | 0 | 0 | 0 | 16 |

Also, it should be understood that other numbers of component colors more or less than four may be used, if desired.

The input image to be converted to color is provided to a suitable conventional scanner-plotter, such as an Optronics Model P-1000. The scanner treats the input images as if it were a matrix of microscopic cells and sequentially scans the input image as a group of adjacent microscopic cells to determine the optical density of each cell. The scanner assigns a density level number to each cell according to the optical density of that cell, and stores the assigned density level for the cell on a suitable memory medium, such as magnetic tape.

After the scanner scans the cells of the image, assigns a density level to these cells and stores the assigned density levels of the cells on tape, the density levels for each cell are converted into the color code defining the number of dots in the array of each cell and the location of the dots in the array to receive the component colors of the display. This assignment of color code to density level may be done manually by reference to a chart, such as Chart I. Alternatively, the assignment of color code may also be performed in a digital computer for time saving purposes.

After the color codes are assigned, the image is in effect a matrix of cells for each of the component colors, with the color code defining the number of dots, and their location, in the array of each cell in the matrix to receive a particular component color. As has been set forth above, the dots in the cells or the color image are preferably 50 microns by 50 microns, arranged in a four-by-four array to form a 200 micron square cell.

With the present invention, it has also been found to be desirable to assign an ascending sequence to the 16 dot areas within the array in each cell which differs from the sequence for each of the other component colors to be used in the final display. For example, FIG. 5A sets forth schematically the ascending sequence of the 16 dot areas to be colored in accordance with the magenta hue specified by the color code. As is evident from FIG. 3A, where the color code for magenta is 14, all but the highest two dot areas, designated "15" and "16" in FIG. 5A, within the cell for the color density level 32 receive magenta color.

In FIG. 5B, the ascending sequence of dot areas in accordance with the increasing presence of yellow component color in the color display is set forth. As is evident from FIG. 3B, where the color code for yellow is 9, the lowest dot areas in the ascending sequence receive yellow color. Similarly, FIGS. 5C and 5D set forth the ascending sequence of application of color to the dot areas for blue (or cyan) and black in accordance with the increasing magnitude of the color code for such component colors.

After the color code is assigned for each cell and each component color, the code is read into a conventional plotter, such as an Optronics Model P-1500 plotter.

The plotter forms a separate film transparency for each of the component colors in the output display, which transparency after being developed in a suitable film developer/processor, contains dots in dot areas in the array defined in number and location within the cells for that particular color according to the color code, which is in turn based on the intensity level of the scanned cells for corresponding portions of the input image.

As has been set forth, the dot areas within a cell are each of the same density, while the frequency of appearance of these dots, as defined by the color code, defines the hue of that color in the cell.

A sheet of photopolymer laminate is then laminated to a display backing. A suitable photopolymer laminate is a film formed from a polyester base with a light-sensitive coating applied thereto, both of which are sandwiched between and protected by upper and lower cover sheets of the suitable plastic. A photopolymer laminate of this type is that film sold by DuPont under its trademark "Cromalin", although other suitable laminates may be used, if desired.

The display backing applied with the laminate is then placed into a processor, such as a vacuum printer, made for example by Berkey-Ascor Corporation of Woodside, New York. In the processor, the photopolymer laminate is exposed to ultraviolet light from an ultraviolet lamp in the presence of a substantial vacuum condition, and a polymer coating is deposited onto the display background according to the presence or absence of dots in the dot areas of the cells of the film transparency. Where dot areas are present in the film transparency, a gummy polyester coating is deposited onto areas of the backing in accordance with the presence of dots in the dot areas. Where the film transparency is transparent and no dots are present in the dot areas, no gummy polyester coating is present.

Color toner of a first color is then applied by hand or by other suitable means to adhere to these gummy areas. In this manner, a first toner color is applied in accordance with the presence or absence of dots in the dot areas of the cells of the output color image, as defined by the color code. After the first toner is applied, a new laminate for the next color is superimposed on the display backing, and a new transparency defining by the presence or absence of dots in the dot areas the amount of color and the location of the color to be formed in the output color display is superimposed thereon. The backing with the newly added laminate and the next successive color transparency are then returned to the processor and the laminate is exposed to form dot areas for the color dots in the cells having dots therein. As set forth above, after the laminate has been exposed in the processor for a sufficient period of time, the backing and laminate are removed from the processor and the cover exposed to expose a gummy polyester coating in those areas where the dot areas as defined by the color code indicate that color dots should be present in the output color display. Further details of the color application technique are set forth in U.S. patent application Ser. No. 441,012, filed Feb. 11, 1974, which is incorporated herein by reference. However, it has been found that since the color dots formed in the present invention are of constant density and size, the images may be superimposed in registry over the previously applied colors without formation of moire interference patterns between the colors.

Processing proceeds in the above manner with a new laminate being superimposed over the previous colors for each transparency for a component color in the output color display. FIG. 2 of the drawings sets forth a color display formed according to the present invention of a portion of an X-ray of a human skull. The sinus cavities of the skull are at the center of the left side of the display, with the curvature of the skull being evident at the top of display. Attention is directed to the color code of the density level at the right of the display indicating in the seventh horizontal bar the color density levels from 97 through 112 being shades from very very light yellow to significant yellow, with the next lower bar being the color density level from 113 through 128 and including increasing amounts of magenta and blue superimposed with the yellow of the density levels 97 through 112. Attention is now directed to the upper center portion of the color display of the skull X-ray wherein relatively minor changes in the 256 scale density level, i.e., from the range of 105 or thereabouts to 116 or thereabouts, indicate by presence of the yellow lines through the purple mass of the brain the presence of blood vessels in the person's brain. Similarly, lighter yellow colors are present in the amber portions of the brain again defining the passages of blood vessels through the brain. Thus, it can be seen that by selectively assigning colors to the intensity levels of the image to be scanned, relatively minor variations in the intensity level of the input image can be made to appear as markedly different colors as an aid in analyzing and evaluating the input images.

DIGITAL DATA INPUT SIGNALS

As has been set forth, the present invention is adapted for processing digital signals, which may be signals stored in a suitable memory device, such as a tape recorder or other suitable digital memory or other signal storage apparatus, or some other suitable source of digital signals.

As an example, the data may be seismic signals processed in a conventional data processing machine such as a computer and then stored on a suitable computer memory or tape. The seismic signals are in the form of coded values representing various colors in a color display of an auxiliary seismic variable which is to be superimposed on a black-and-white seismic section. Suitable auxiliary seismic variables are interval velocity, reflection strength, coherence, cross-dip, any of which can be compared against a threshold level prior to display, with only those variables exceeding the threshold level being displayed, or an auxiliary variable as discriminated by a second auxiliary variable, e.g., reflection strength discriminated by signal coherence. Processing techniques to obtain data of this form of seismic variables are set forth in U.S. Pat. No. 3,961,306. "Method of Forming Color Graphic Display From Input Data", assigned to the assignee of the present invention.

The processing results of this form are plural signals in a suitable signal sequence, one signal in the form of digital data representing a conventional black-and-white seismic section, and three signals representing the density values of the three component colors: magenta, cyan and yellow. These component colors when displayed as dots in the matrix of cells according to the present invention form the colors in the auxiliary seismic variable which is superimposed as a color modulation on the black-and-white seismic section, together with a calibrated key representing the color assigned to the numerical values of the variable, for ease in analysis and quantitative interpretation of numerical values of the data. A suitable chart for allocating the number of dot areas and the location of dot areas in the cells according to the color code of the present invention will be set forth below.

The input data is provided to a conventional signal plotter, such as an Optronics Plotter Model P-1500 which forms an image on a transparency in the form of dot areas whose number and location in the arrays within the cells in the matrix of the transparency are defined by the color code to be set forth below. The input signals are plotted onto transparencies for each of the component colors of the color display to be formed, in this embodiment four.

The output film transparencies from the plotter are then developed in a suitable photograph developer so that developed transparencies are produced which contain therein constant density dots in number and location as defined by the color code for each of the cells. A first sheet of photopolymer laminate of the type set forth above is then laminated to a display backing, and a first developed output transparency superimposed thereon. The laminate and transparency are then placed in the printer and exposed to the ultraviolet light therefrom. Where because of the data content of the input signal there are dot areas within the cells, the ultraviolet light from the source does not harden the polymer emulsion in the coating, thereby leaving gummy or sticky dot areas on the display backing. The number of dot areas and their location on the display backing to which the coating of adhesive emulsion adheres is controlled by the number and location of dot areas in the transparency as determined by the color code.

Figure 4A:
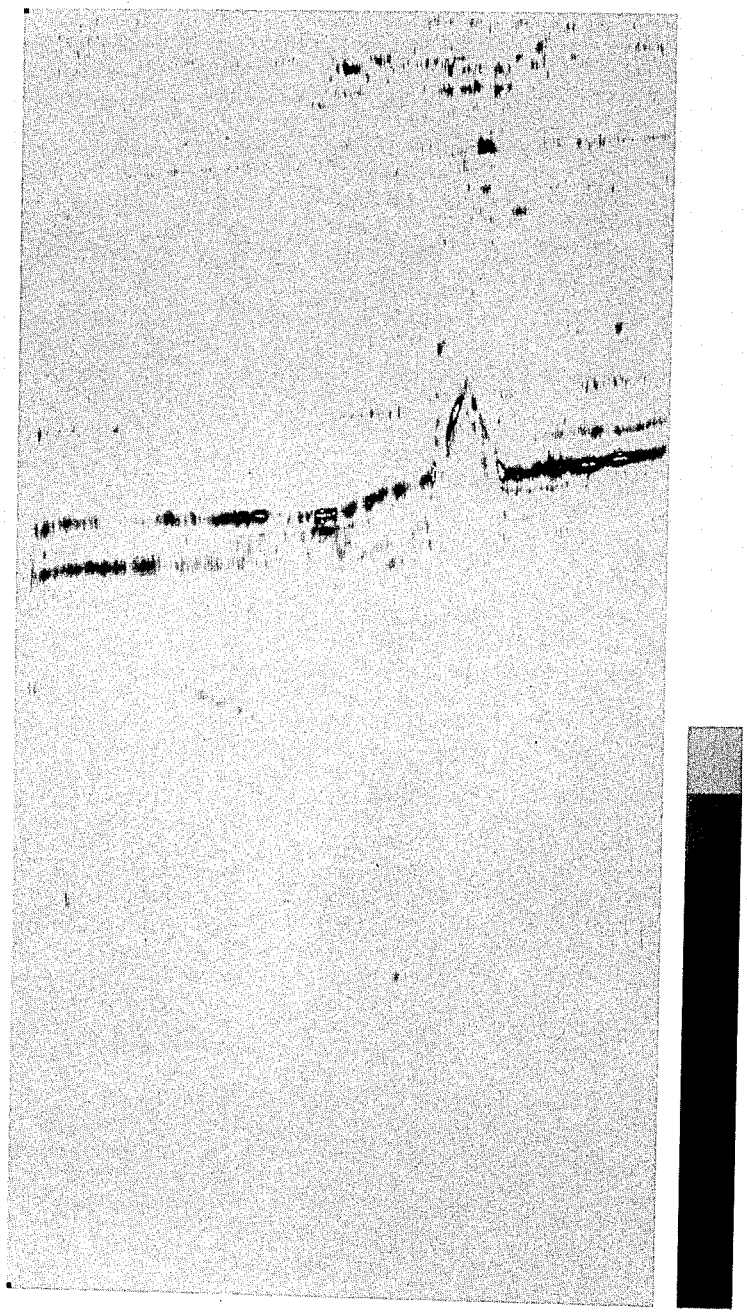
FIGS. 4A, 4B, 4C and 4D are displays of a seismic section, with a superimposed modulation, formed according to the present invention.
Figure 4B:
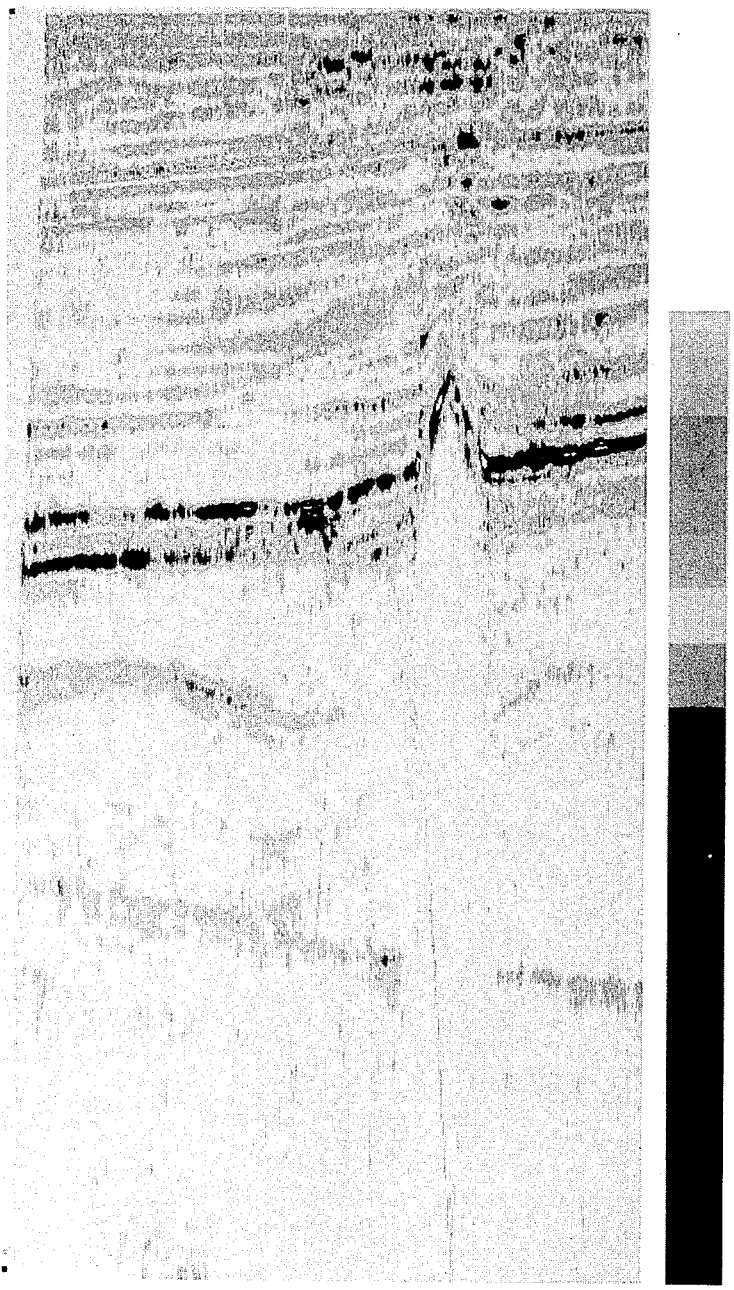
Figure 4C:
Figure 4D:
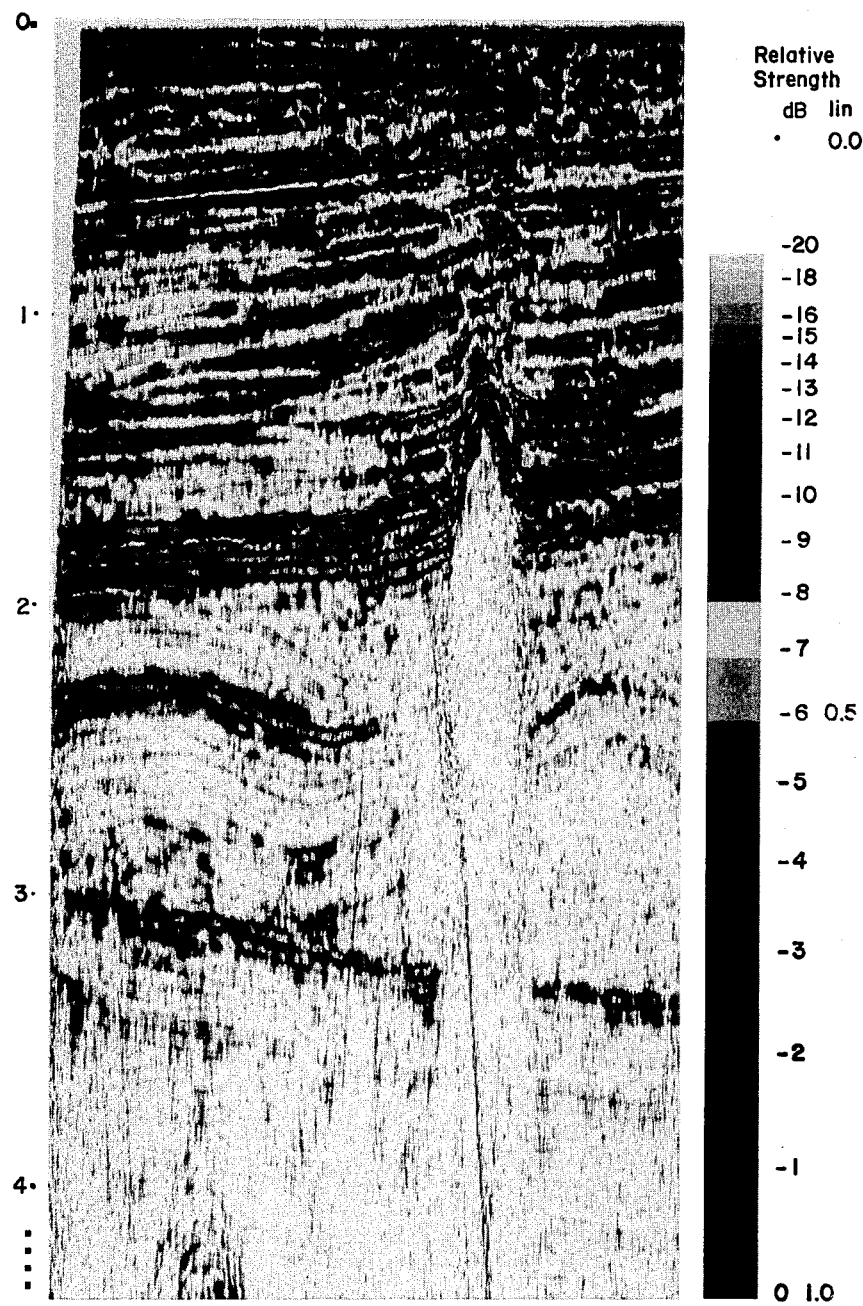
Figure 4E:
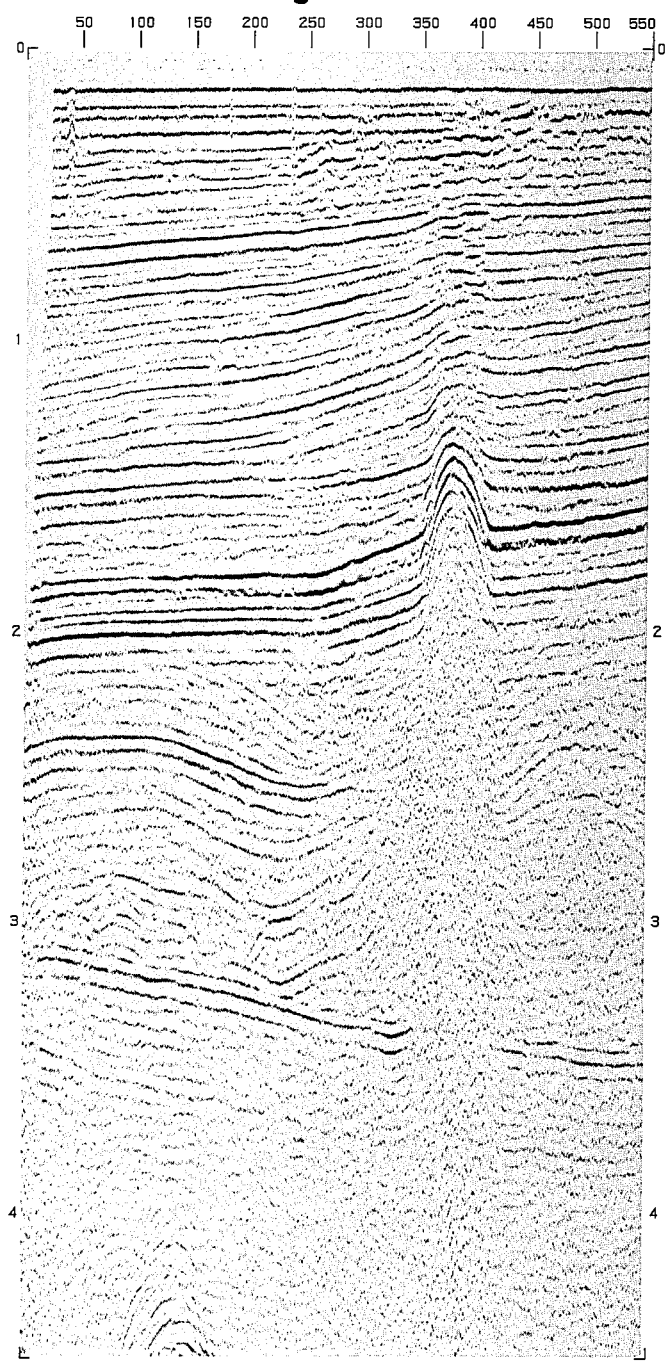
FIG. 4E is a black-and-white display of the seismic section of FIG. 4D.

After the display backing and laminate have been exposed a sufficient time within the printer, the backing and transparency are removed from the printer, and the upper cover sheet of the photopolymer laminate is removed, exposing the adhesive emulsion coatings. A conventional color toner dust of a first color is then applied to the gummy areas on the display backing by hand or other suitable means. FIG. 4A illustrates a display backing according to the present invention having a magenta toner dust applied to dot areas defined by a color code to be set forth below. The steps of placing a new laminate for the next color and exposing the laminate to form dot areas for dots in the cells for each of the transparencies formed in the plotter are repeated until all component colors have been applied to the color display to be formed. FIG. 4B represents the seismic section of FIG. 4A after application of yellow color in dot areas defined by the color code, while FIG. 4C is the section of FIG. 4B after cyan color dots have been applied thereto. FIG. 4D represents the color display of FIG. 4C having the black-and-white seismic section of FIG. 4E displayed thereon with auxiliary seismic variable of reflection strength of a seismic signal superimposed as a color modulation from FIG. 4C thereon. The horizontal dimension across the display of FIG. 4D is distance along a seismic survey line as indicated by spacing lines, while the vertical dimension is seismic signal travel time indicated by seconds 0, 1, 2, 3, and 4 along the left edge of the display. A calibrated color key is formed therewith to permit numerical analysis of the assigned numerical values of the reflection strength function in the seismic data in accordance with the color code. The color key at the right of FIG. 4D, as is evident from inspection, indicates by color variations from magenta for maximum relative strength through shades of orange, yellow, green and blue calibrated numerical variations in the relative strength of this seismic strength which are superimposed as a color modulation to increase the information content of the section for geophysical analysis, as contrasted to the black-and-white display in FIG. 4E.

The following chart indicates the assignment of color code to the relative strengths set forth in the calibrated color key to the right of FIG. 4D:

CHART II

| Color No. | Magenta | Yellow | Cyan | Black | Relative Strength |
|-----------|---------|--------|------|-------|-------------------|
|           | M       | Y      | C    | B     | (db)              |
| 1         | 0       | 0      | 0    | 0     | −20               |
| 2         | 0       | 0      | 2    | 0     |                   |
| 3         | 0       | 0      | 5    | 0     | −18               |
| 4         | 0       | 0      | 8    | 0     |                   |
| 5         | 0       | 0      | 11   | 0     | −16               |
| 6         | 0       | 3      | 9    | 0     | −15               |
| 7         | 0       | 5      | 11   | 0     | −14               |
| 8         | 0       | 7      | 13   | 0     | −13               |
| 9         | 0       | 9      | 14   | 0     | −12               |
| 10        | 0       | 16     | 16   | 0     | −11               |
| 11        | 0       | 15     | 13   | 0     | −10               |
| 12        | 0       | 13     | 10   | 0     | −9                |
| 13        | 0       | 11     | 6    | 0     | −8                |
| 14        | 0       | 5      | 0    | 0     | −7                |
| 15        | 0       | 16     | 0    | 0     | −6                |
| 16        | 4       | 16     | 0    | 0     | −5                |
| 17        | 8       | 16     | 0    | 0     | −4                |
| 18        | 10      | 16     | 0    | 0     | −3                |
| 19        | 12      | 16     | 0    | 0     | −2                |
| 20        | 16      | 16     | 0    | 0     | −1                |
| 21        | 16      | 0      | 0    | 0     | 0                 |

The foregoing chart sets forth the number of dot areas within each cell in the matrix of both the color seismic display of FIG. 4D and the calibrated color key adjacent thereto. The location of the particular number of dot areas in the cell is defined by the ascending sequence of assignment of the dot areas to the cells as has been set forth with respect to FIG. 5.

In certain color displays, rather than superimposing the black-and-white image (FIG. 4E) into the color display (FIG. 4C) to form the output display (FIG. 4D), it may be desirable to have alternating scans, or various ratios of scans, of vertical rows of cells of color, and black-and-white.

In forming these displays, for example for alternate color and black-and-white scans, the plotter is adjusted so that only each alternate vertical row of cells for the image of each constituent color is plotted, with the other alternate row left blank. Correspondingly, the plotter is adjusted so that for black, each alternate vertical row of cells coinciding with the alternate rows of color cells is deleted, forming an output display of alternate vertical rows of color cells and black-and-white cells. It should be understood that in addition to this alternating (or 1:1) scan ratio, other scan ratios (e.g., 2:1, 3:1, 3:2 and the like) may be used, if desired.

Accordingly, the present invention forms color displays readily and quickly from input data with the presence of color dots and the location of the color dots representing the numerical variations in the data, without requiring that special purpose signal processing equipment be used. As has been set forth above, the present invention further permits a definite, repeatable color to be repetitively obtained for each of the images to be formed. Further, the color dots according to the present invention are density independent so that their absence or presence, rather than their density defines the hues and colors formed. The proportion or relative number of appearances of dots of a particular color in the cell defines the saturation or relative intensity of that color in the cell, and the physical and/or visual superposition of the various component colors defines the apparent or resultant color in the cell.

Furthermore, with the color code used in the process of the present invention, a user can assign the same color to more than one particular number, and the assignment can be linear, logarithmic or in any coded desired numerical relationship so that the range of change in the variable can be indicated by variations in color and more easily noted.

Although in the preferred embodiment set forth above the color in the output image has been applied by using color toners of one type, it should be understood that the output image could be applied to silk screens, or printing plates, and further that other color toner technique and color reproduction techniques such as color photocopying may be used as well. Also, although an X-ray with a black-and-white image has been set forth as the input image, the present invention may also form color displays from other input color images by scanning the input color images through a suitable filter for each of the component colors.

Although photographic and film processing are set forth as the preferred embodiment for forming dot areas to receive color, it should be understood that other techniques for color application may be used as well. Examples are pin perforation, acid etching or laser etching of dot areas on a base material followed by application of ink or dye to the dot areas so formed; electron beam scanning; and depositing gummy areas on a backing by impact printing or electrostatic depositing with subsequent application of color ink or dye.

The foregoing disclosure and description of the invention are illustrative and explanatory thereof, and various changes in the size, shape, and materials as well as in the details of the illustrated construction may be made without departing from the spirit of the invention.

What is claimed is:

1. In forming color graphic displays directly from a sequence of input digital data values, wherein differing colors at data display points in the color displays are quantitatively indicative of differing values or ranges of values of the digital data, and processed input digital data to be displayed at the data display points have numerical codes assigned thereto from an assignment table, with the assignment table comprised of a set of numerical codes referenced as a two-dimensional matrix, one dimension of the matrix representing sample values of the data to be displayed, each sample value representing an assigned range from a plurality of ranges into which the input data values are partitioned, and the other dimension of the matrix representing a plurality of component displays, one component display for each component color in the color displays to be formed, and further with the numerical codes of the set specifying the visual image densities to be formed at data display points of the component displays and further specifying the relative density of each component color in the colors associated with such data display points according to the sample values thereof, and further with the numerical codes assigned to the data display points organized into output sequences for each of the component displays, the improved method of forming a component color display for each output sequence, comprising the steps of:
   a. dividing the areas of the component displays into cells;
   b. further dividing the cells in the component displays into a plurality of elementary areas or dots;

c. applying the component colors to the dots in the cells of their respective component displays according to the assigned numerical codes; and d. displaying in superposition the component displays in their respective component colors to thereby form the color graphic display wherein the resulting color mixtures of colored dots of the data display points quantitatively indicate the input digital data values.

2. The method of claim 1, wherein the component colors include three or more constituent colors.

3. The method of claim 2, wherein the component colors include white, black and shades of gray.

4. The method according to claim 2, wherein the component colors include the primary colors.

5. The method of claim 1, wherein the material represents an additional component color.

6. The method of claim 1, wherein the position of each cell is defined by a Cartesian coordinate system and in which the dots comprising each cell are arranged and referenced in a square or rectangular array.

7. The method of claim 1, in which the sum of areas of all the proportions of component colors is equal to the total area of at least one cell.

8. The method of claim 1, in which the sum of the areas of proportion of any component color is less than the total area of at least one cell, such that no color is applied to some areas.

9. The method of claim 1, in which the sum of the areas of proportions of component colors is greater than the total area of at least one cell, such that a plurality of colors is applied to some individual dots.

10. The method of claim 1, in which each mixture of color is used to represent a different sample value.

11. The method according to claim 10, in which the sample value represents the numerical values of a one-dimensional variable and in which the cells are arranged in sequence along a trace such that the variations in color along the trace represent the variations of the variable.

12. The method according to claim 11, in which the variable represents a measurement of the properties of the earth as a function of depth or of the travel-time of a seismic reflection signal.

13. The method according to claim 11, in which the variable represents a property of an image observed along a line of scan.

14. The method according to claim 13, in which the variable represents a measurement of the properties of the earth as a function of position on a plane of profile.

15. The method according to claim 10, in which the sample value represents the numerical values of a two-dimensional variable and in which the area to be colored represents two dimensions of variation.

16. The method according to claim 14, in which the variable represents a property of a two-dimensional image as a function of position on the plane of the image.

17. The method of claim 1, wherein the elementary areas or dots are each of predetermined size.

18. The method of claim 1, wherein said step of applying component colors comprises the steps of:

a. depositing a polymer coating in the dot areas according to the assigned numerical codes; and b. applying a color toner to adhere to the dot areas of deposited polymer coating.

19. The method of claim 18, wherein the dot areas of the cells are located in the cells in an ascending sequence according to increasing values of the numerical codes.

* * * * *